United States Patent
Juliato et al.

(10) Patent No.: US 11,995,183 B2
(45) Date of Patent: May 28, 2024

(54) CONTEXT-BASED RESPONSE TO ATTACKS AGAINST AUTONOMOUS SYSTEMS

(71) Applicant: Intel Corporation, Santa Clara, CA (US)

(72) Inventors: Marcio Juliato, Portland, OR (US); Shabbir Ahmed, Beaverton, OR (US); Christopher Gutierrez, Hillsboro, OR (US); Vuk Lesi, Cornelius, OR (US); Manoj Sastry, Portland, OR (US); Qian Wang, Portland, OR (US)

(73) Assignee: INTEL CORPORATION, Santa Clara, CA (US)

(*) Notice: Subject to any disclaimer, the term of this patent is extended or adjusted under 35 U.S.C. 154(b) by 313 days.

(21) Appl. No.: 17/357,885

(22) Filed: Jun. 24, 2021

(65) Prior Publication Data
US 2021/0326437 A1 Oct. 21, 2021

(51) Int. Cl.
*G06F 21/55* (2013.01)

(52) U.S. Cl.
CPC ...... *G06F 21/554* (2013.01); *G06F 2221/034* (2013.01)

(58) Field of Classification Search
CPC .......... G06F 21/554; G06F 2221/034; H04L 63/1408; H04L 63/1416; H04L 63/1425; H04L 63/1441; H04L 63/1458; H04L 63/1466
See application file for complete search history.

(56) References Cited

U.S. PATENT DOCUMENTS

| | | | | |
|---|---|---|---|---|
| 10,158,717 B2 * | 12/2018 | Kishikawa | ............. | H04L 63/10 |
| 10,275,955 B2 * | 4/2019 | Gupta | ............. | H04L 63/1408 |
| 11,479,263 B2 * | 10/2022 | Ruan | ............. | H04L 41/142 |
| 2019/0001964 A1 * | 1/2019 | Lin | ............. | B60W 30/02 |
| 2020/0233956 A1 * | 7/2020 | Wang | ............. | B60L 53/305 |
| 2020/0413264 A1 | 12/2020 | Han et al. | | |
| 2021/0114606 A1 | 4/2021 | Alvarez et al. | | |

FOREIGN PATENT DOCUMENTS

| | | | | | |
|---|---|---|---|---|---|
| JP | 20066219133 A | * | 5/2006 | ............. | B60T 17/18 |
| JP | 2009067091 A | * | 4/2009 | ............. | B06W 10/02 |
| KR | 20170070580 A | | 6/2017 | | |
| WO | WO 2019/116054 A1 | * | 6/2019 | ............. | H04L 29/06 |
| WO | WO 2020/212442 A1 | * | 10/2020 | ............. | H04L 29/06 |
| WO | WO 2021/124110 A1 | * | 6/2021 | ............. | G05B 17/02 |

OTHER PUBLICATIONS

European Search Report dated Aug. 30, 2022, for Application No. 22161859.8 (five (5) pages).

* cited by examiner

*Primary Examiner* — Christopher A Revak
(74) *Attorney, Agent, or Firm* — KDW Firm PLLC

(57) ABSTRACT

Systems, apparatuses, and methods to response to detected attacks in an autonomous system based on context of the autonomous system are described. In particular, the disclosure provides an intrusion detection system receiving contexts and contracts dictating particular response guide rails from a higher level components or stack on the autonomous system. The intrusion detection system is arranged to respond to attacks according to the contract without intervention by the higher level components or stack.

24 Claims, 12 Drawing Sheets

CONTEXT-BASED RESPONSE TO ATTACKS AGAINST AUTONOMOUS SYSTEMS

BACKGROUND

Modern computing increasingly includes automations and many systems today are referred to as autonomous. For example, automotive vehicles have a number of autonomous features from automated breaking and lane keeping assist to full automated driving features. Such systems often have a security component to protect the system from unauthorized or malicious tampering. These security components are often located in the lower levels of the systems computing structure. However, as the security features are often located at lower levels of the computing structure, these security features often do not have sufficient information to respond to attacks. Likewise, where the security components are relocated to higher levels of the computing structure, the security components often do not have sufficient control over the system during an attack.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Various embodiments of the present disclosure provide for an autonomous system where context-based responses are repeatedly generated. These context-based responses can be carried out in the event that the autonomous system is attacked. For example, in the case of an autonomous vehicle (AV) acceptable steering and braking actions can repeatedly be generated based on the context of the vehicle (e.g., road trajectory in next 500 feet, or the like). These acceptable steering and braking actions can be executed by low level actuation and control components of the vehicle in the event that the vehicle is attacked or compromised. As such, safety of the vehicle is not entirely dependent upon the higher-level autonomous control systems remaining functional in the event of an attack.

Figure 1:
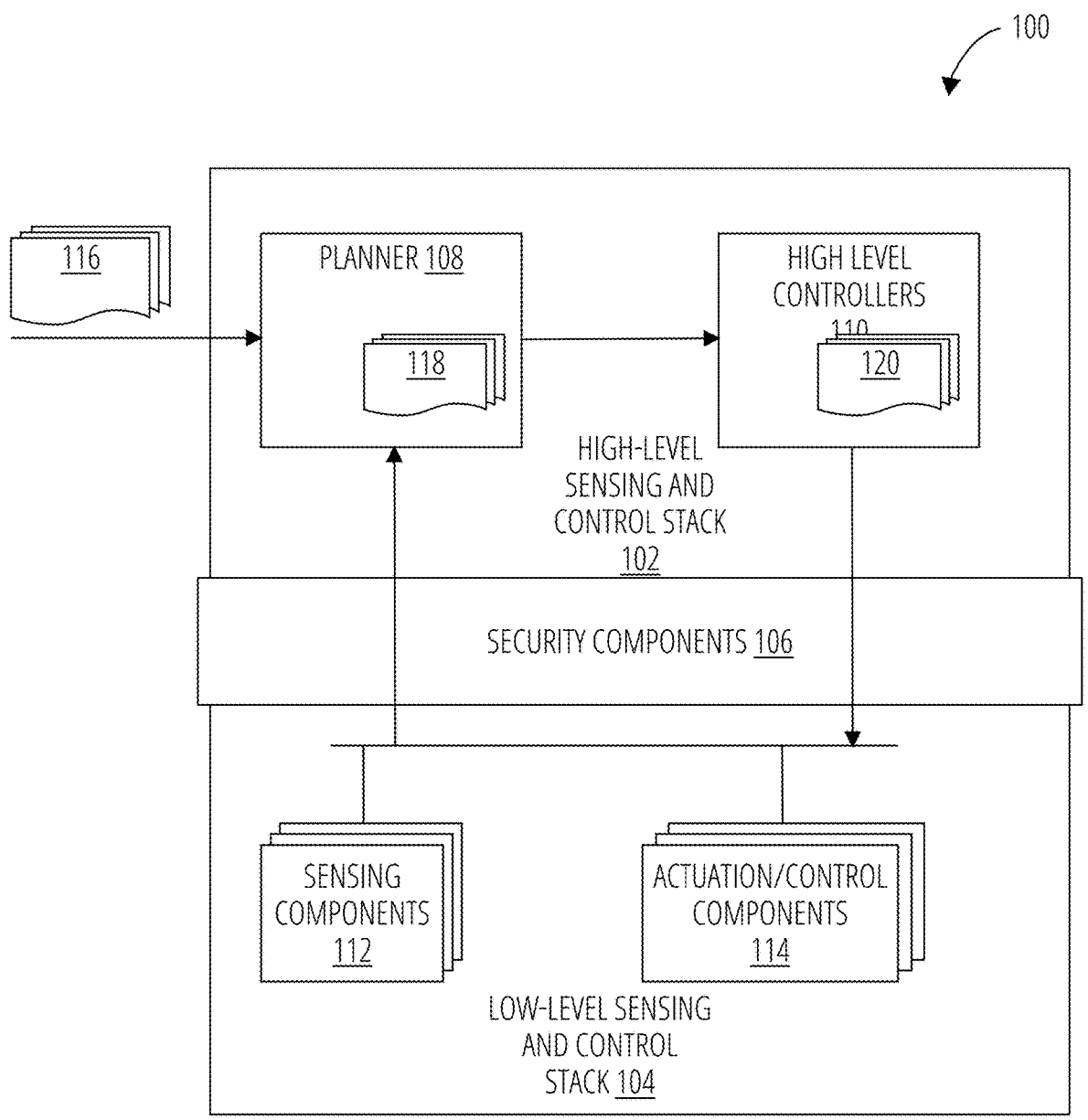
FIG. 1 illustrates an autonomous system 100 in accordance with non-limiting example(s) of the present disclosure.

FIG. 1 illustrates an autonomous system 100 in accordance with non-limiting example(s) of the present disclosure. In general, as used herein an autonomous system is a system where certain actions or behaviors are automated. Said differently, an autonomous system is a system where control and actuation signals are generated based on a policy and output from sensors. The policy can be a decision tree, a model, or other decision policy. For example, autonomous system 100 includes a high-level sensing and control stack 102 and low-level sensing and control stack 104 separated by security components 106. In general, security components 106 can be an intrusion detection system (IDS) arranged to monitor autonomous system 100 for unauthorized and/or malicious activity. Responsive to detecting malicious activity, security components 106 can be arranged to take action(s) to mitigate effects of the detected unauthorized and/or malicious activity.

High-level sensing and control stack 102 includes planner 108 and high-level controllers 110 while low-level sensing and control stack 104 includes sensing components 112 and actuation and control components 114. Although not shown, high-level sensing and control stack 102 can further include a processor and memory comprising instructions executable by the processor. For example, the memory can include planner 108 instructions, which when executed by the processor cause the autonomous system 100 to receive information related to a perception 116 and to generate a trajectory plan 118 from the perception 116 information and/or outputs from sensing components 112. Further, the memory can include high level controllers 110 instructions, which when executed by the processor cause the autonomous system 100 to generate trajectory control 120 from trajectory plan 118. The actuation and control components 114 can use the trajectory control 120 as input to cause actuation and/or control behaviors in the autonomous system 100.

Figure 2A:
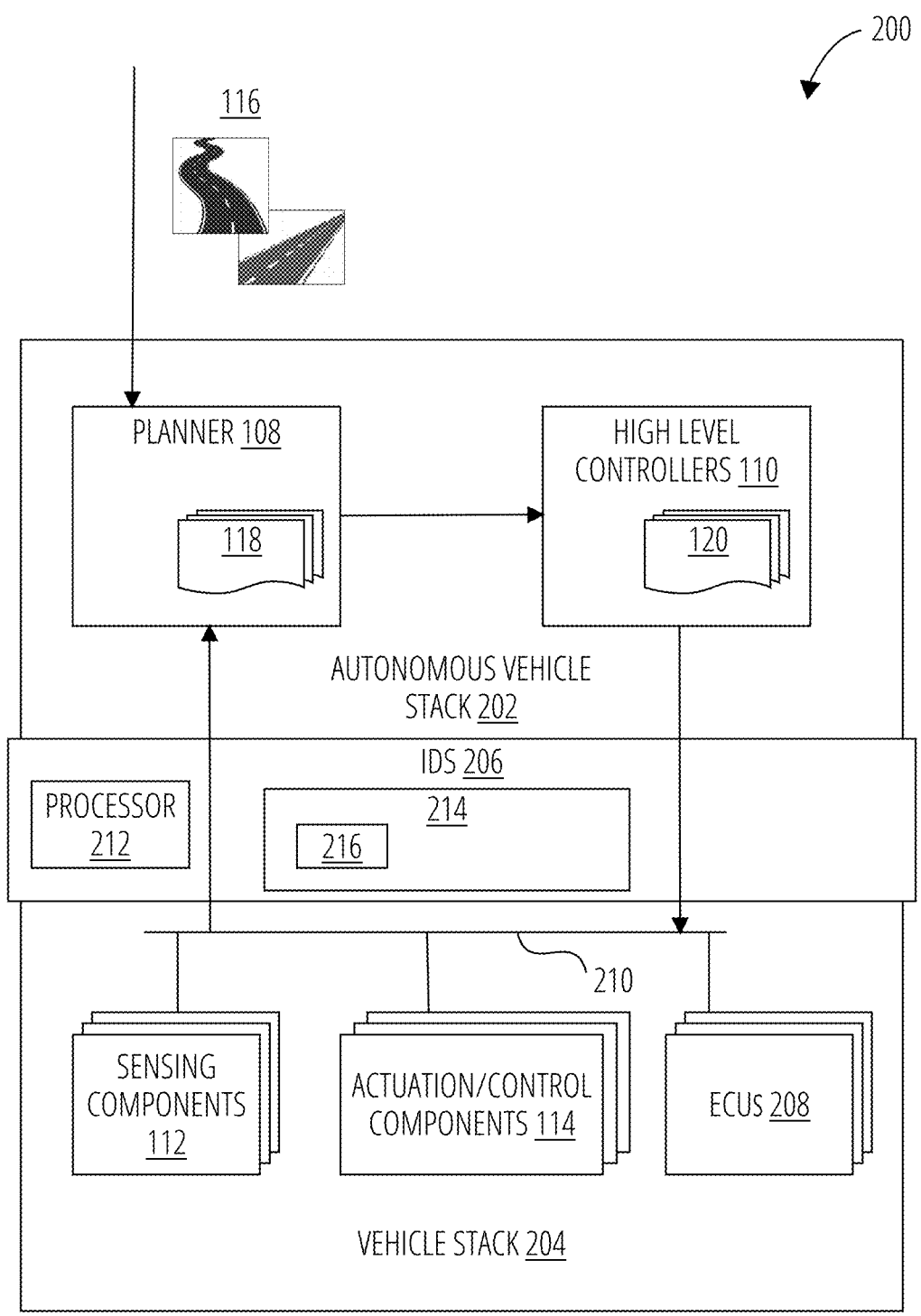
FIG. 2A illustrates an autonomous vehicle system 200 in accordance with non-limiting example(s) of the present disclosure.

FIG. 2A illustrates an autonomous vehicle system 200 in accordance with non-limiting example(s) of the present disclosure. Autonomous vehicle system 200 includes components similar to that described above with respect to autonomous system 100 and FIG. 1. However, autonomous vehicle system 200 is provided as an example of an autonomous automotive system. It is noted, that the present disclosure is applicable to any of a variety of different types of autonomous systems, including autonomous vehicles. However, an autonomous vehicle example is reused throughout this disclosure for ease of explanation and consistency. This is not intended to be limiting.

Autonomous vehicle system 200 includes autonomous vehicle stack 202 and vehicle stack 204, separated by intrusion detection system 206. Like security components 106, intrusion detection system 206 can be arranged to monitor and take action to mitigate unauthorized and/or malicious activity. In particular, intrusion detection system 206 can include a processor 212 and memory 214. Memory 214 includes instructions 216, which, when executed by the processor 212 cause the processor to implement the functions described herein. Autonomous vehicle stack 202 includes planner 108 and high-level controllers 110 while vehicle stack 204 includes sensing components 112, actuation and control components 114, and ECUs 208.

Processor 212 can include any of a variety of processing circuitry and/or processors, such as, for example, commercial central processing units, application specific integrated circuits, microcontrollers, or the like. Processor 212 can be a microprocessor or a commercial processor and can include one or multiple processing core(s) and can also include cache memory.

Memory 214 can be based on any of a wide variety of information storage technologies. For example, memory 214 can be based on volatile technologies requiring the uninterrupted provision of electric power or non-volatile technologies that do not require and possibly including technologies entailing the use of machine-readable storage media that may or may not be removable. Thus, each of these storages may include any of a wide variety of types (or combination of types) of storage devices, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). Additionally, memory 214 can include memory storage devices.

In general, each of ECUs 208 include circuitry arranged to generate messages and transmit the messages onto in vehicle network 210 and/or consume messages from in vehicle network 210. The ECUs 208 can be any of a variety of devices, such as, for example, sensor devices, actuator devices, microprocessor control devices, or the like and will often be different types of ECU devices. ECUs 208 include circuitry arranged to manipulate voltage levels on in vehicle network 210 to communicate messages via the in vehicle network 210.

It is to be appreciated that modern vehicles have many (often hundreds) of ECUs (e.g., ECUs 208). These ECUs are communicatively coupled via an in-vehicle network (IVN) 210, such as, as a CAN bus. There are multiple ECUs for engine control, transmission, airbags, antilock brakes, cruise control, electric power steering, audio systems, power windows, power doors, power mirror adjustment, battery, recharging systems for hybrid/electric cars, environmental control systems, auto start stop systems, blind spot monitoring, lane keeping assist systems, collision avoidance systems, and more.

Additionally, many modern vehicles can include auxiliary control systems that couple to the ECUs and in-vehicle network via a gateway. Attackers can attempt to force the auxiliary control system or the gateway off the bus in a similar manner as described above. The present disclosure is directed towards responding to attacks in a context-based manner, as described herein. Although the examples and communication networks described herein use vehicles as an example, the present disclosure can be implemented in a variety of contexts, such as, for example, industrial networks, vehicular networks, manufacturing networks, retail operation networks, warehousing networks, or the like. Further, although vehicular networks are often used in this description as an example, the claims are not limited to in-vehicle networks.

Like high-level sensing and control stack 102, autonomous vehicle stack 202 can further include a processor and memory comprising instructions executable by the processor. For example, the memory can include planner 108 instructions, which when executed by the processor cause the autonomous vehicle system 200 to receive information related to a perception 116 (e.g., images of a road on which the vehicle of which 200 is a part is driving, or the like) and to generate a trajectory plan 118 from the perception 116 information and/or outputs from sensing components 112. Further, the memory can include high level controllers 110 instructions, which when executed by the processor cause the autonomous vehicle system 200 to generate trajectory control 120 from trajectory plan 118. The actuation and control components 114 can use the trajectory control 120 as input to cause actuation and/or control behaviors in the autonomous vehicle system 200.

In a real-world setting, autonomous vehicle system 200 is susceptible to a number of different attack vectors. For example, an attacker can masquerade as a sensor sending false or inaccurate (e.g., steering angle signals, engine RPM signal, or the like) or can masquerade as a command signal and send false commands (e.g, acceleration command, steering angle adjustment command, or the like). Additionally, an attacker can attempt to force components off the IVN 210, such as ones of the ECUs 208 or even the entire autonomous vehicle stack 202. This is referred to as a bus-off attack.

Intrusion detection system 206 can be arranged to detect masquerading attacks and bus-off attacks and respond accordingly. For example, in conventional autonomous vehicles, a malicious ECU may be disconnected from the IVN 210. As another example, the autonomous vehicle stacks 202 can be configured with redundant signals to tolerate a number of attacks. However, where the autonomous vehicle stack 202 itself is disconnected from the IVN 210, it is unable to respond to detection of malicious activity by the intrusion detection system 206. Furthermore, where critical ones of ECUs 208 are disconnected from the IVN 210, these ECUs cannot perform their function. For example, if a steering or braking control ECU is disconnected from the IVN 210 steering or breaking control will no longer be available in autonomous vehicle system 200.

As such, the present disclosure provides to repeatedly generate context-based responses that are acceptable in the event of an attack. These context-based responses can be carried out by components of the vehicle stack 204, for example, in the event that autonomous vehicle stack 202 is disconnected or compromised. As such, limited, but safe control of the vehicle in which autonomous vehicle system 200 is implemented can be achieved in the event of attacks on the vehicle.

Figure 2B:
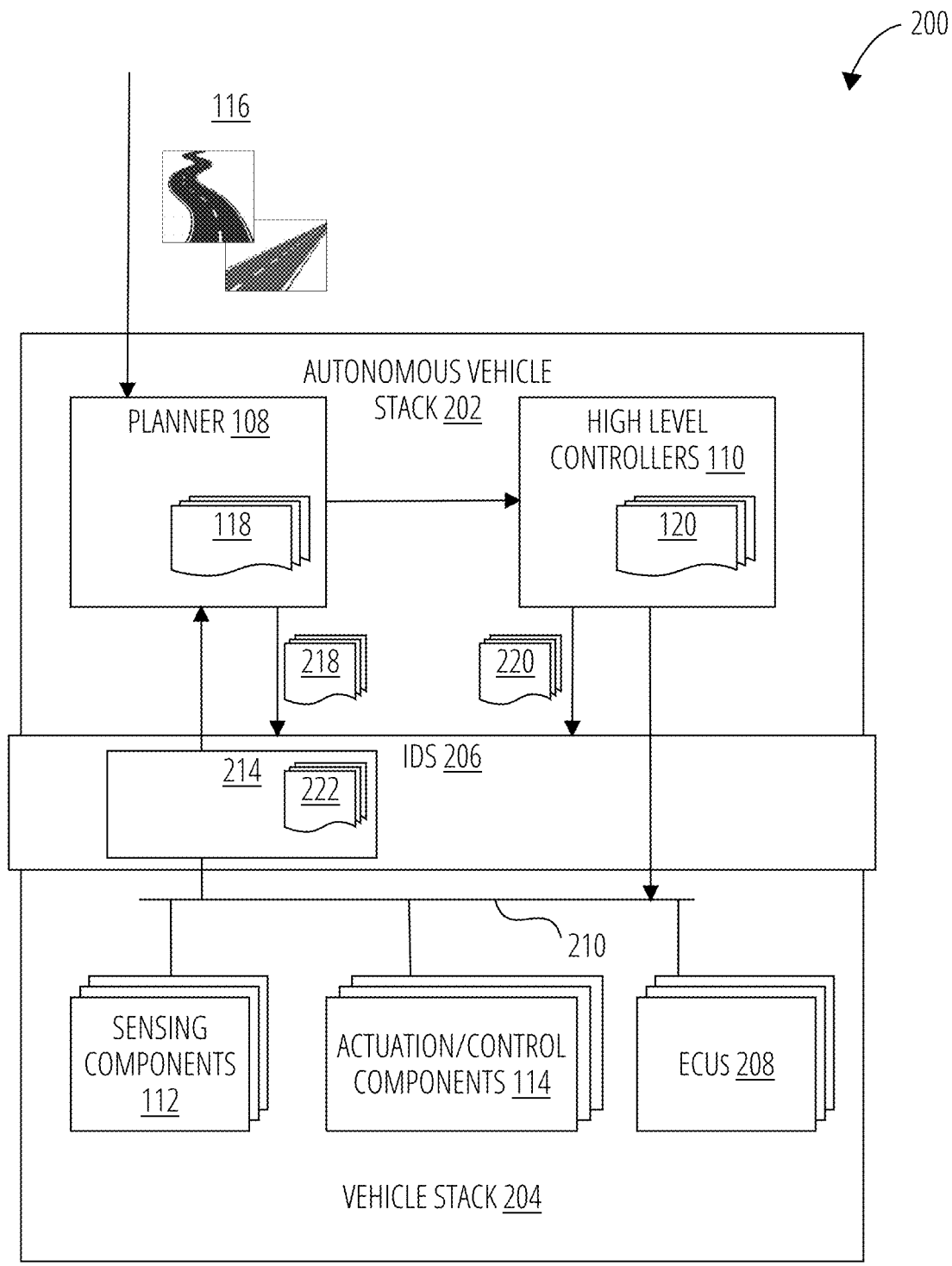
FIG. 2B illustrates the autonomous vehicle system 200 in accordance with non-limiting example(s) of the present disclosure.
Figure 2C:
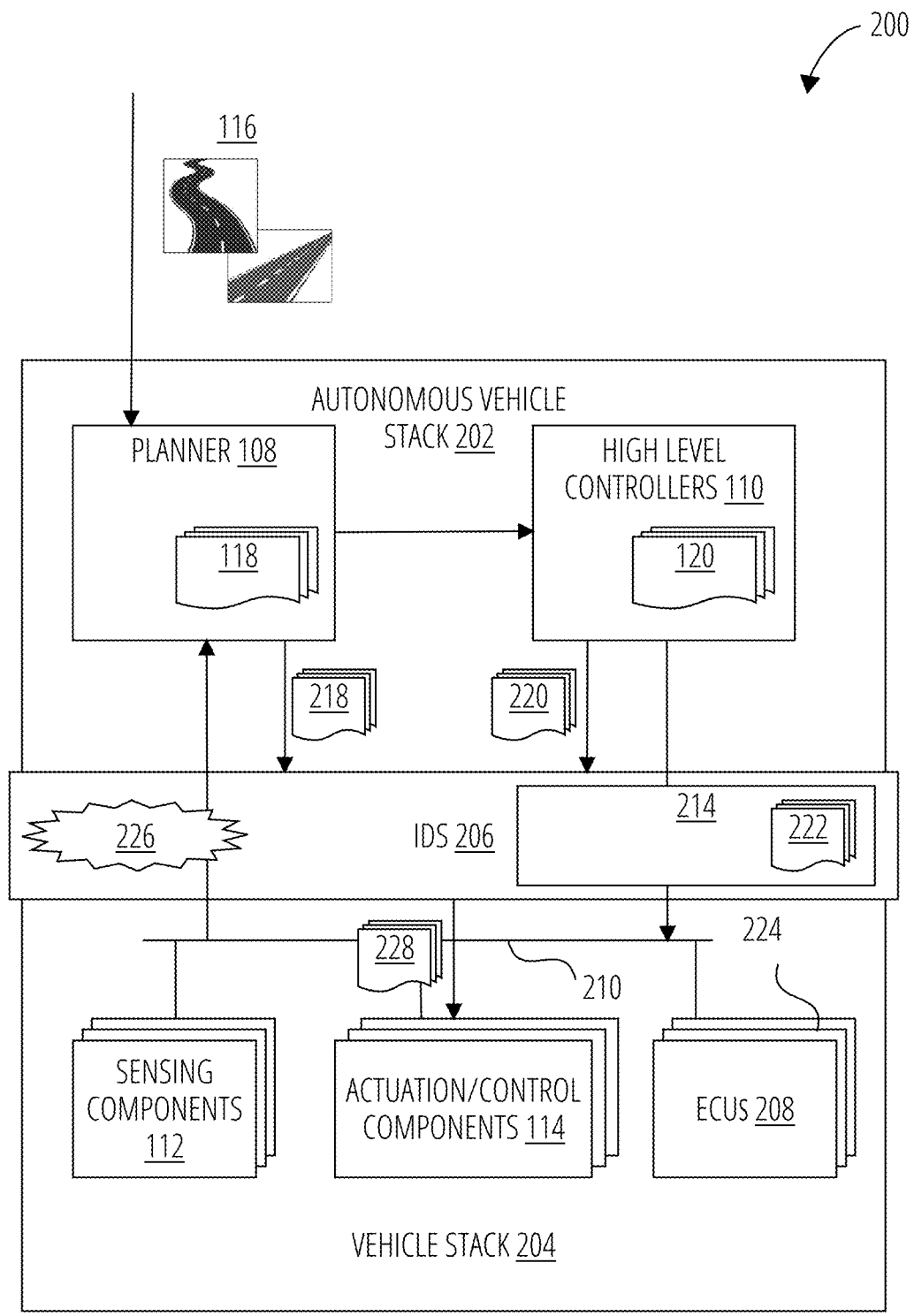
FIG. 2C illustrates the autonomous vehicle system 200 in accordance with non-limiting example(s) of the present disclosure.

For example, FIG. 2B illustrates autonomous vehicle system 200 providing contexts 218 and contexts 220 to intrusion detection system 206. This is described in greater detail with respect to FIG. 3.

Figure 3:
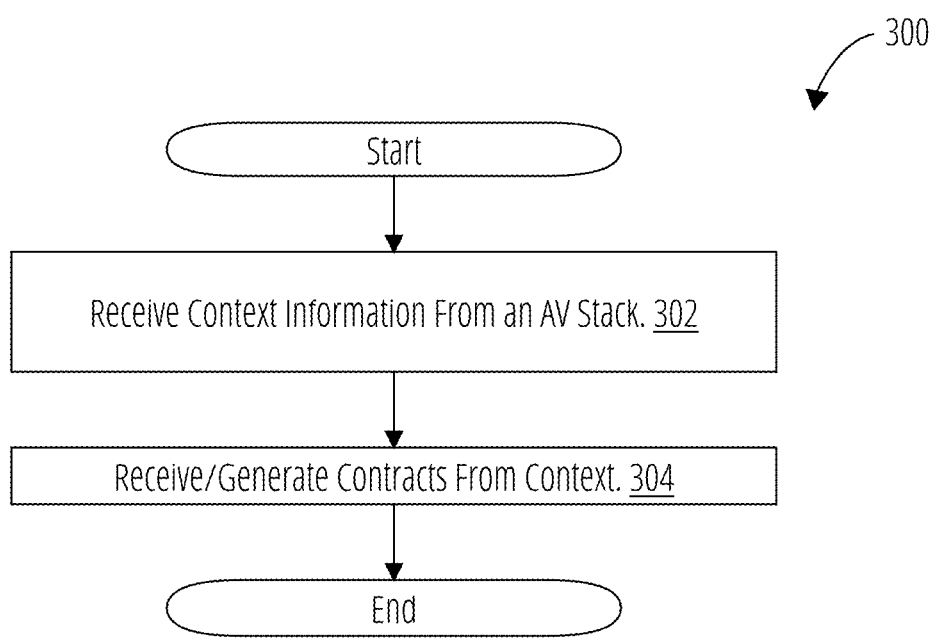
FIG. 3 illustrates a routine 300 to receive context and contracts to respond to an attack on an autonomous system in accordance with non-limiting example(s) of the present disclosure.

FIG. 3 depicts a routine 300, in accordance with non-limiting example(s) of the present disclosure. The routines and logic flows described herein, including routine 300, and other logic flows or routines described herein, are representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 4A:
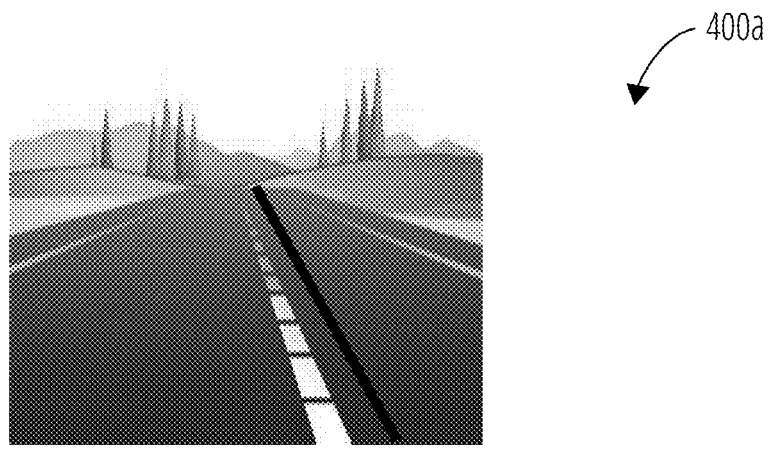
FIG. 4A illustrates an image 400a associated with a context of an autonomous system in accordance with non-limiting example(s) of the present disclosure.
Figure 4B:
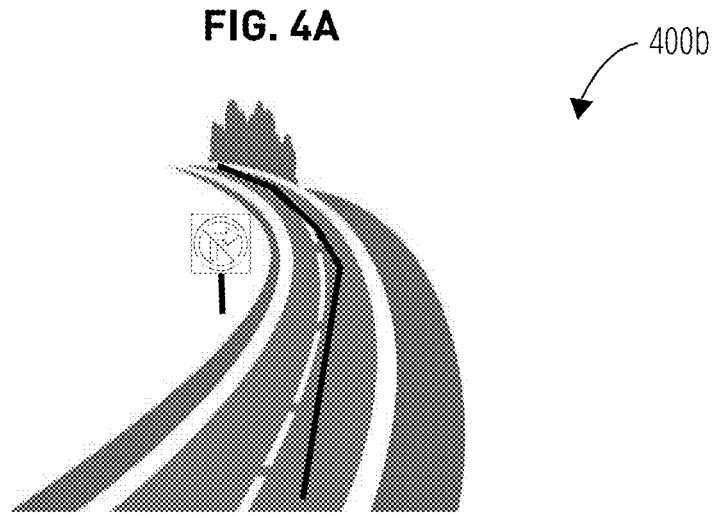
FIG. 4B illustrates an image 400b associated with a context of an autonomous system in accordance with non-limiting example(s) of the present disclosure.
Figure 4C:
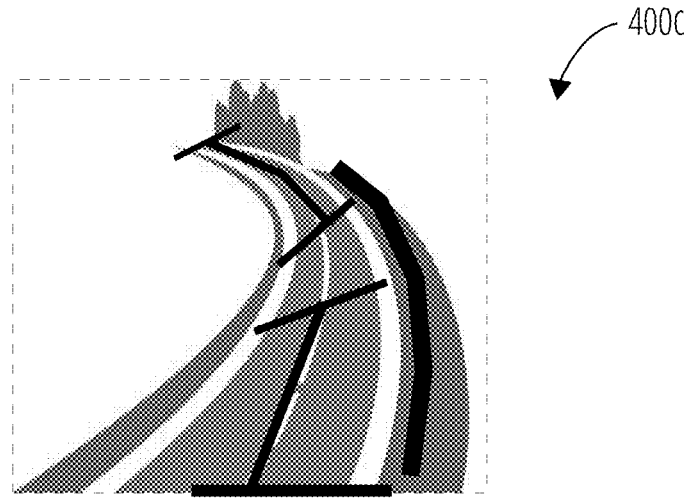
FIG. 4C illustrates an image 400c associated with a context of an autonomous system in accordance with non-limiting example(s) of the present disclosure.

Routine 300 can be implemented by an intrusion detection system (IDS), such as by intrusion detection system 206 of autonomous vehicle system 200. Typically, routine 300 can be implemented prior to intrusion detection system 206 detecting an attack. Routine 300 can begin at block 302 "receive context from AV stack" where an IDS can receive context information from an AV stack. For example, processor 212 can execute instructions 216 to receive information elements comprising indications of contexts 218 and 220 from planner 108 and high-level controllers 110. In some examples, contexts can be indications of environmental, traffic, and road condition contexts. For example, FIG. 4A illustrates an image 400a. During operation of autonomous vehicle system 200, image 400a can be received by autonomous vehicle stacks 202 (e.g., via perception 116, or the like) and contexts associated with image 400a generated and provided to intrusion detection system 206. As a specific example, contexts associated with image 400a can be (1) straight road for miles, (2) excellent road conditions, (3) inappropriate shoulder to pull over, (4) no traffic in front of vehicle, and (4) no oncoming traffic. Said differently, intrusion detection system 206 can receive contexts 218 and/or contexts 220 from autonomous vehicle stack 202 comprising an indication of the above listed contexts for image 400a. As another example, FIG. 4B illustrates image 400b, which could be received (e.g., via perception 116, or the like) by autonomous vehicle stack 202. Contexts associated with image 400b can be (1) curved road by a cliff, (2) cliff on right hand side, and (3) and upcoming left-hand curve. As a third example, FIG. 4C illustrates image 400c, which could also be received (e.g., via perception 116, or the like) by autonomous vehicle stack 202. Contexts associated with image 400c can be (1) straight road for 50 meters, (2) 30 degree left hand curve, and (3) straight road for 70 meters.

Continuing to block 304 "receive contracts based on contexts" where an IDS can receive contracts based on the contexts received at block 302. For example, processor 212 can execute instructions 216 to receive contracts 222 from contexts 218 and contexts 220. It is noted, that in some examples, the contracts 222 are generated by "higher-level" components of the autonomous vehicle system 200, such as, the autonomous vehicle stack 202 while in other examples, the intrusion detection system 206 receives the contexts 218 and 220 and then generates the contracts 222 from the contexts as detailed herein. Examples are not limited in this respect.

In some examples, contracts 222 can include both an indication of an expectation relative to the contexts as well as an acceptable action relative to the contexts. The contracts 222 (e.g., expectation and acceptable action) can be used to both detect an attack and also respond when an attack is detected. This is explained in greater detail below. However, returning to FIG. 4A, FIG. 4B, and FIG. 4C, examples of contracts associated with the contexts for each image are provided herein. For example, processor 212 can execute instructions 216 to generate contracts 222 from contexts derived based on image 400a to include an expectation that (1) the vehicle will drive straight, (2) only slight steering is anticipated, and (3) acceleration and braking area acceptable. Furthermore, contracts 222 can include an indication that acceptable actions in the event of an attack are (1) longitudinal actions are prioritized over lateral actions (2) steering is not acceptable, (3) deviation to oncoming lane unlikely to cause a crash, and (4) actuate braking. As another example, processor 212 can execute instructions 216 to generate contracts 222 from contexts derived based on image 400b to include an expectation that (1) the vehicle will drive straight until the left turn, (2) no abrupt steering to the right at any time, (3) small fluctuations in speed, and (4) no major accelerations. Furthermore, contracts 222 can include an indication that acceptable actions in the event of an attack are (1) steering is not acceptable for 80 meters, (2) steering to the left at 80 meters, (3) no accelerations, and (4) braking allowed. As a third example, processor 212 can execute instructions 216 to generate contracts 222 from contexts derived based on image 400c to include an expectation that the vehicle will drive straight for 50 meters, (2) soft steering (small angle) to the left at 50 meters, (3) soft braking at 50 meters, (4) no acceleration, (5) steering to center after left hand turn at 50 meters, and (6) no steering after the left hand turn at 50 meters. Furthermore, contracts 222 can include an indication that acceptable actions in the event of an attack are (1) no steering to the right, (2) small accelerations before and after the left hand turn at 50 meters, and (3) braking and steering to the shoulder are acceptable but there are obstacles.

With some examples, contexts 218 and 220 may just be an image (e.g., image 400a, or the like) while in other examples, contexts 218 and 220 may be a description of the context (e.g., as outlined above). Still, in some examples, the contracts 222, derived from contexts 218 and 220 can be more complex than described above. For example, the following table details a number of possible indications that can be generated for contracts 222 from contexts 218 and 220, where the image 400a is indicated by contexts 218 and 220.

| Con-texts | Possible Attack | Nominal | | Emergency | |
|---|---|---|---|---|---|
| | | Contracts | Response | Contract | Response |
| Lon-gi-tudi-nal | 1. Brake controller unavailable. 2. Attacker applying soft brake. 3. | Permitted: (1) Apply soft braking; (2) Reduce gearing; (3) Increase | 1. Issue soft braking control command. 2. If attacker is applying soft braking, | Permitted: (1) Increase speed; (2) Decrease speed. | 1. Issue command to brake on behalf of the brake controller. If situation |

-continued

| Contexts | Possible Attack | Nominal Contracts | Nominal Response | Emergency Contract | Emergency Response |
|---|---|---|---|---|---|
| | Powertrain controller unavailable. | speed. Forbidden: (1) Sudden braking; (2) Exceed speed limit, | allow progression without immediate response. 3. Issue command(s) to either (1) decelerate or (2) maintain speed. | Forbidden: None. | requires, can apply maximum force. 2. Issue additional brake commands to counteract attacker. 3. Issue commands to maintain or reduce speed. |
| Lateral | 1. AV stack or lateral controller unavailable. steering to the left. | Permitted: Soft steering within the lane. Forbidden: (1) Abrupt steering; (2) Steering 2. Attacker towards unpaved shoulder; (3) Steering towards opposing lane. | 1. Correct trajectory if needed. 2. Disconnect steering ECU and issue commands to softly steer to the right. | Permitted: (1) Steer to the right shoulder preferred; (2) Steer to the opposing lane if needed. | 1. Correct trajectory if needed. 2. Steer to the right, even if the vehicle enters the unpaved shoulder. |

In some examples, the contexts 218 and 220 can be just an image (e.g., a copy of image 400a, or the like) while in other examples, contexts 218 and 220 can include both the image and a description of the context as outlined herein. Furthermore, multiple different acceptable actions can be provided. For example, as illustrated in the above table actions for a nominal response (e.g., actions to keep the current trajectory) as well as an emergency response (e.g., actions to minimize impacts on safety) are provided.

Figure 4D:
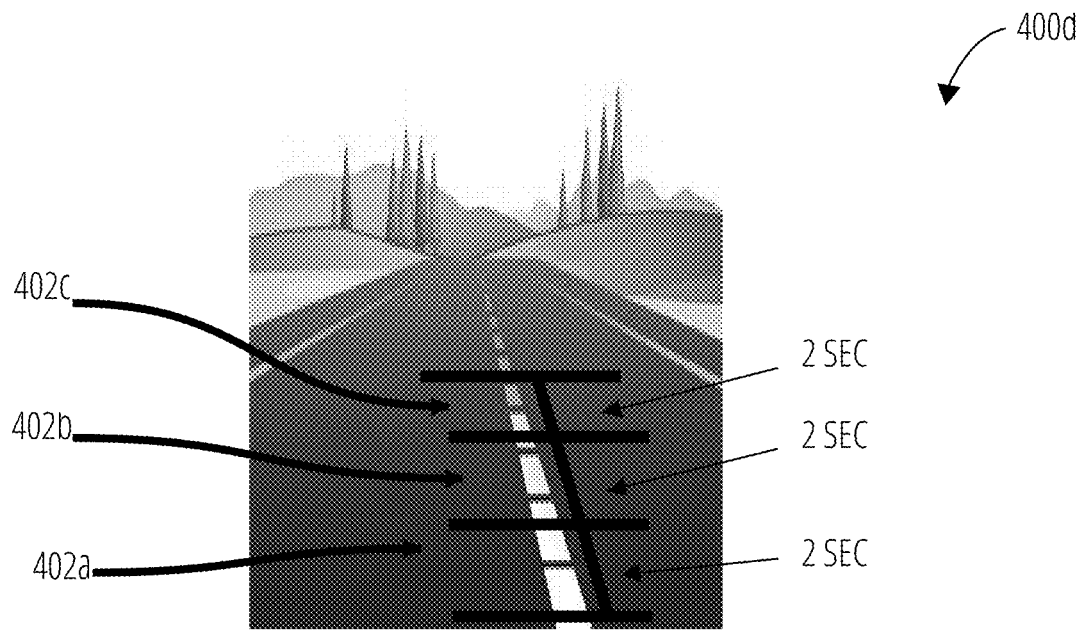
FIG. 4D illustrates an image 400d associated with a context of an autonomous system in accordance with non-limiting example(s) of the present disclosure.
Figure 4E:
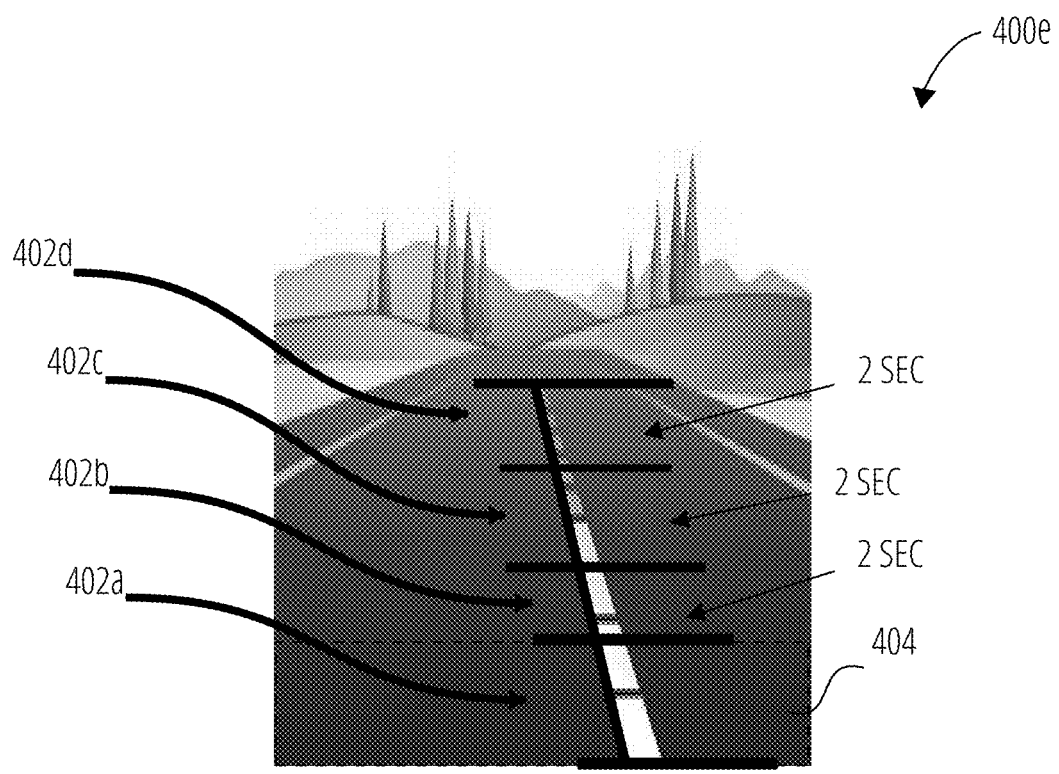
FIG. 4E illustrates an image 400e associated with a context of an autonomous system in accordance with non-limiting example(s) of the present disclosure.

With further examples, the contexts 218 and 220 can be split into segments (represented as distance, time, or the like). For example, FIG. 4D illustrates image 400d depicting a context split into segments 402a, 402b, and 402c. During operation, intrusion detection system 206 can repeatedly receive context (e.g. contexts 218 and 220) from autonomous vehicle stack 202 and regenerate contracts 222 from the newly or recently received contexts. Said differently, routine 300 can be repeated (e.g., on a fixed period, at set points such as distance traveled, segment end reached, or the like). FIG. 4E illustrates image 400e depicting an update, or progression, to the context depicted in FIG. 4D after a period of time 404 has elapsed. As can be seen, segment 402a is shaded, indicative that the segment 402a has been traversed while new segment 402d is depicted.

In some example, segments are represented by periods of time (e.g., segments 402a, etc. FIG. 4D and FIG. 4E) while in other examples, segments are represented by distance. For example, FIG. 4F illustrates image 400f depicting a context split into segments 406a and 406b, which are represented in distance as opposed to time to traverse the segment.

Figure 4F:
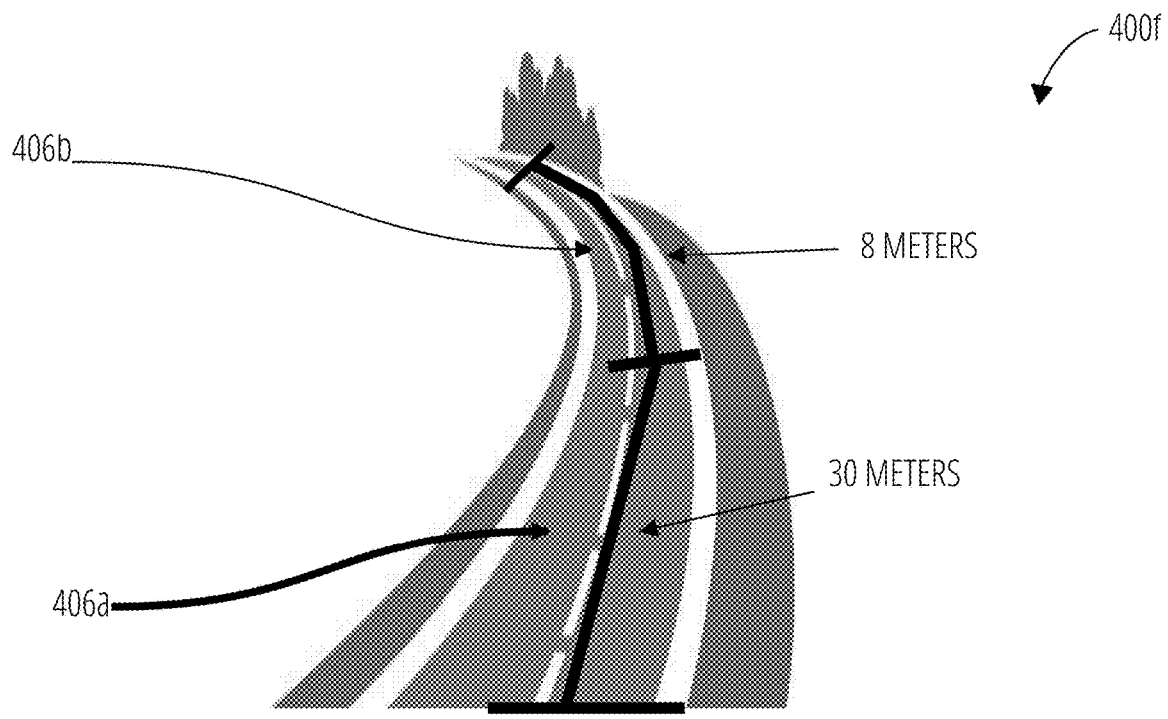
FIG. 4F illustrates an image 400f associated with a context of an autonomous system in accordance with non-limiting example(s) of the present disclosure.
Figure 4G:
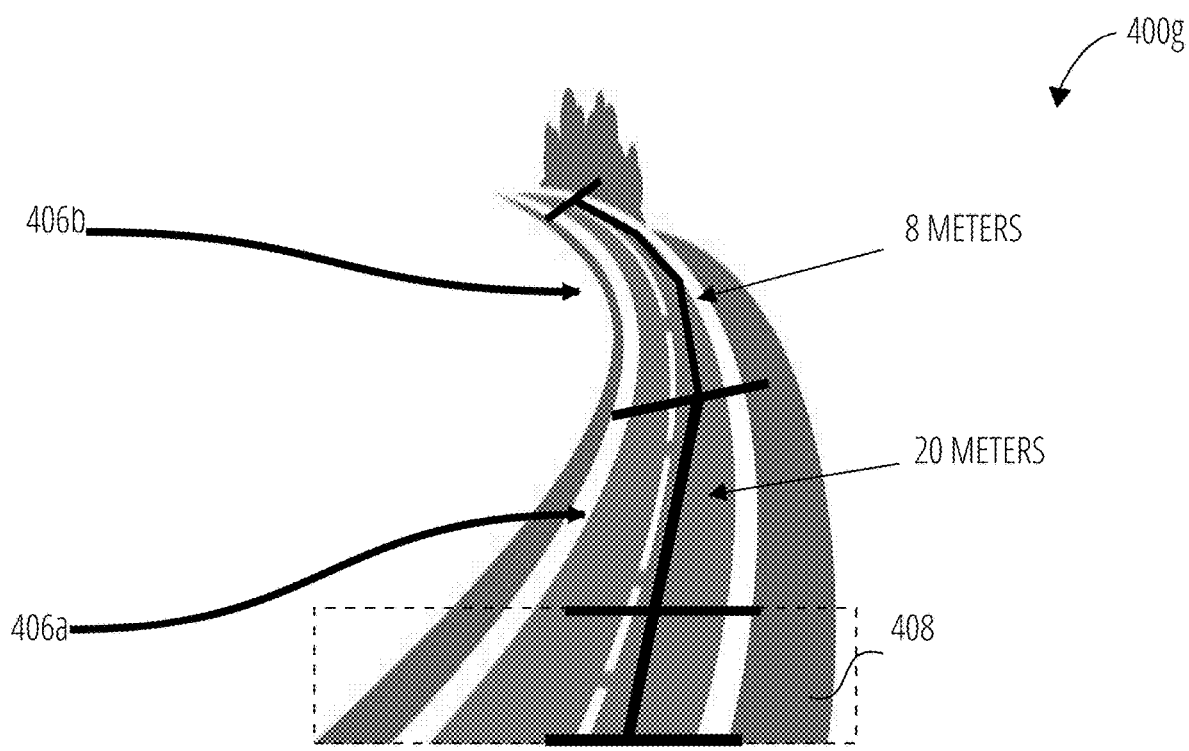
FIG. 4G illustrates an image 400g associated with a context of an autonomous system in accordance with non-limiting example(s) of the present disclosure.

FIG. 4G illustrates image 400g depicting an update, or progression, to the context depicted in FIG. 4F after a period of time 408 has elapsed. As can be seen, segment 406a is partially shaded, indicative that a part of segment 406a has been traversed. Furthermore, an update to the remaining distance of segment 406a is shown.

It is to be appreciated, that routine 300 will be repeated during operation. For example, updated contexts 218 and 200 and well as contracts 222 are generated (e.g., at set intervals, after set distance traveled, upon reaching landmarks, or the like). For example, contexts 218 and 220 can be updated after a set distance is traveled or upon reaching various roadway marks (e.g., stop sign, yield sign, speed limit sign, or the like).

Figure 5:
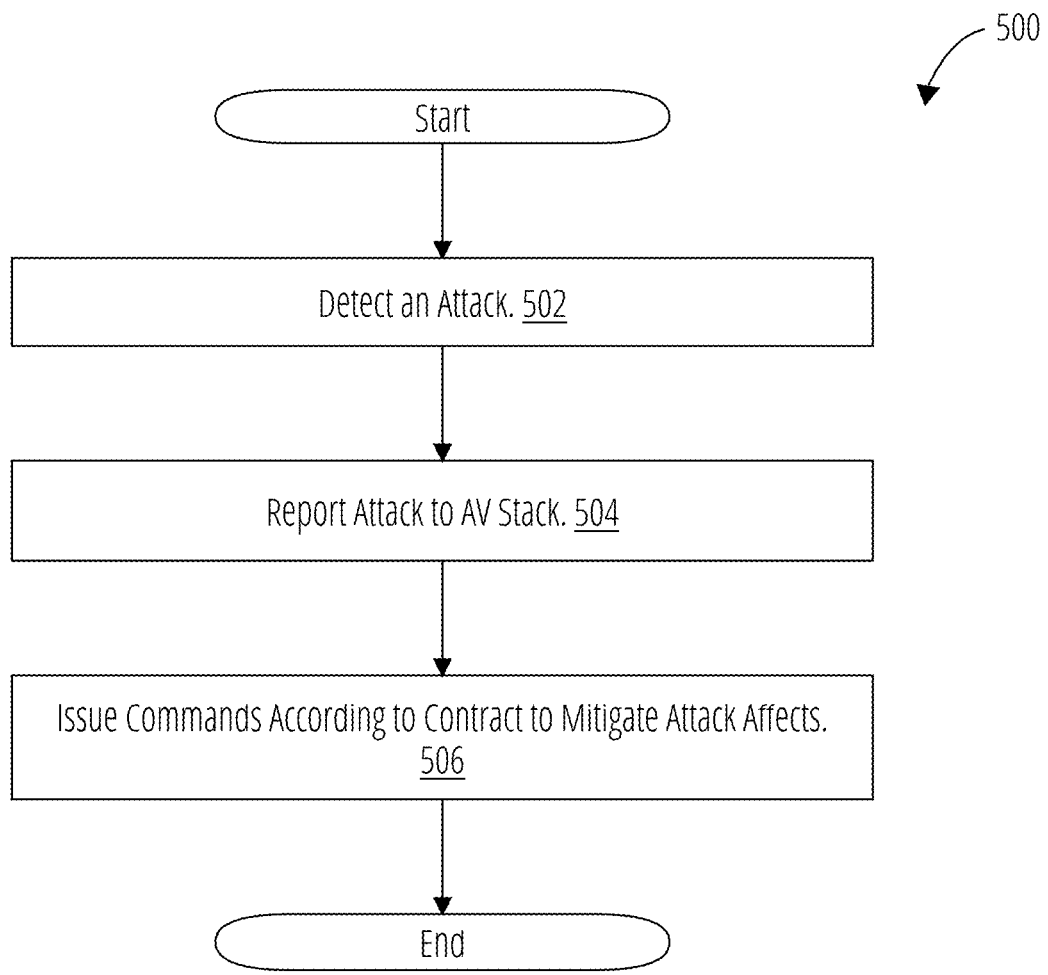
FIG. 5 illustrates a routine 500 to respond to an attack on an autonomous system based on context in accordance with non-limiting example(s) of the present disclosure.

FIG. 5 illustrates a routine 500 that can be implemented by an IDS (e.g., intrusion detection system 206, or the like) to mitigate effects of an attack. Routine 500 can begin at block 502 "detect an attack" where an attack can be detected. For example, processor 212 can execute instructions 216 to detect an attack on the autonomous vehicle system 200. In some examples, an attack can be detected based on detecting a masquerading attack, a bus-off attack, attacks against sensing components, or the like. In other examples, processor 212 can execute instructions 216 to detect a sudden change in the received contexts 218 and 220 to detect an attack. For example, a sudden change in the context (e.g., snapshot of road different from prior snapshot) can indicate an attack on the autonomous vehicle stack 202.

Continuing to block 504 "report attack to the AV stack" where the IDS reports the attack to the AV stack. For example, processor 212 can execute instructions 216 to report the attack to the autonomous vehicle stack 202. In particular, processor 212 can execute instructions 216 to send an information element to autonomous vehicle stack 202 including indications of the attack (e.g., malicious ECU, affected ECU, type of attack, etc).

Continuing to block 506 "issue command according to contract to mitigate attack affects" where the IDS can issue commands according to the contract (e.g., most recent contract, or the like) to mitigate the effects of the attack detected at block 502. For example, processor 212 can execute instructions 216 to cause commands to be issued according to the contracts 222. For example, if the contracts 222 state to issue commands to the brake controller, the processor 212 can execute instructions 216 to issue commands to the brake controller as required by the contracts 222.

Figure 6:
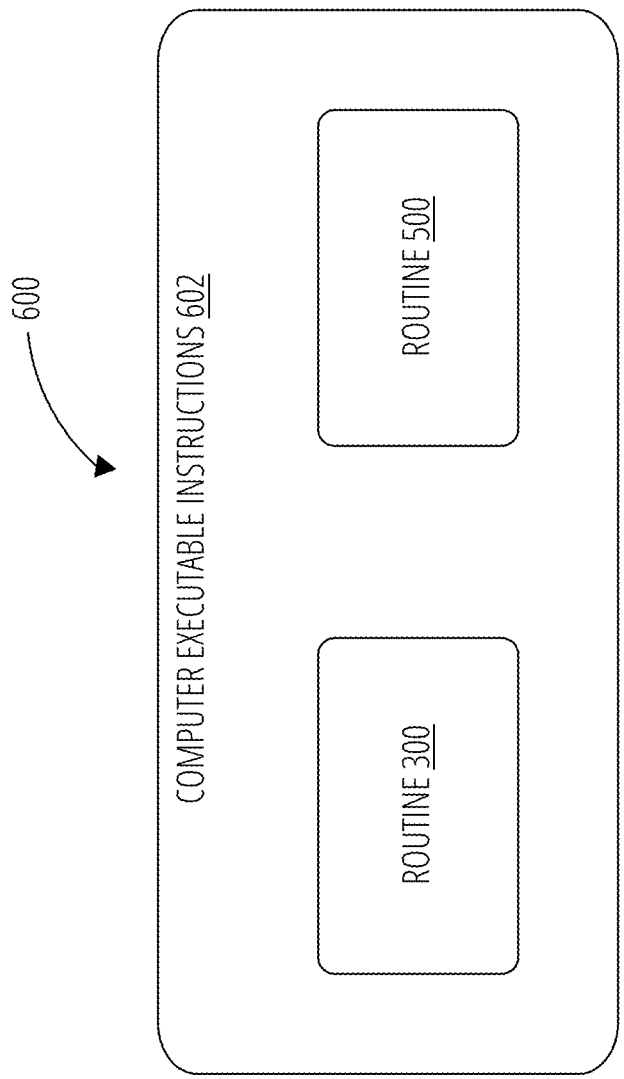
FIG. 6 illustrates a storage device 600 in accordance with non-limiting example(s) of the present disclosure.

FIG. 6 illustrates an example of a storage device 600. Storage device 600 may comprise an article of manufacture, such as, any non-transitory computer readable medium or machine readable medium, such as an optical, magnetic or semiconductor storage. Storage device 600 may store various types of computer executable instructions 602, such as instructions to implement routine 300 and/or routine 500. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 7:
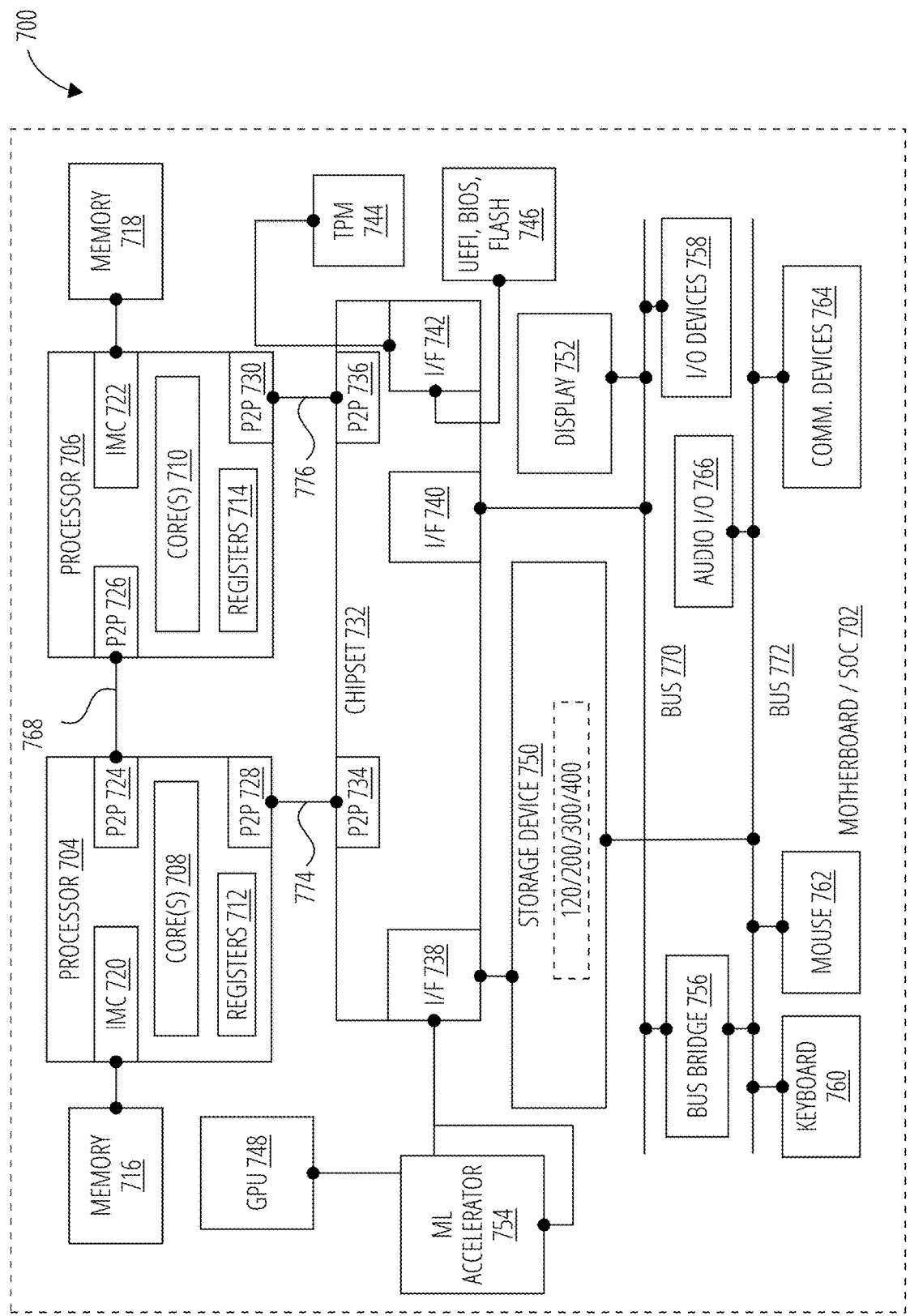
FIG. 7 illustrates a system 700, in accordance with non-limiting example(s) of the present disclosure.

FIG. 7 illustrates an embodiment of a system 700. System 700 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the system 700 may have a single processor with one core or more than one processor. Note that the term "processor" refers to a processor with a single core or a processor package with multiple processor cores. In at least one embodiment, the computing system 700 is representative of the components of the autonomous vehicle system 200. More generally, the computing system 700 is configured to implement all logic, systems, logic flows, methods, apparatuses, and functionality described herein. As a specific example, system 700 can be implemented as part of intrusion detection system 206 and arranged to implement the IDS feature of receiving contexts and contracts and responding to attacks according to the contracts as described herein.

As used in this application, the terms "system" and "component" and "module" are intended to refer to a computer-related entity, either hardware, a combination of hardware and software, software, or software in execution, examples of which are provided by the exemplary system 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in this figure, system 700 comprises a motherboard or system-on-chip (SoC) 702 for mounting platform components. Motherboard or system-on-chip (SoC) 702 is a point-to-point (P2P) interconnect platform that includes a first processor 704 and a second processor 706 coupled via a point-to-point interconnect 768 such as an Ultra Path Interconnect (UPI). In other embodiments, the system 700 may be of another bus architecture, such as a multi-drop bus. Furthermore, each of processor 704 and processor 706 may be processor packages with multiple processor cores including core(s) 708 and core(s) 710, respectively. While the system 700 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processor 704 and chipset 732. Some platforms may include additional components and some platforms may include sockets to mount the processors and/or the chipset. Furthermore, some platforms may not have sockets (e.g. SoC, or the like).

The processor 704 and processor 706 can be any of various commercially available processors, including without limitation an Intel® Celeron®, Core®, Core (2) Duo®, Itanium®, Pentium®, Xeon®, and XScale® processors; AMD® Athlon®, Duron® and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi processor architectures may also be employed as the processor 704 and/or processor 706. Additionally, the processor 704 need not be identical to processor 706.

Processor 704 includes register registers 712, integrated memory controller (IMC) 720 and point-to-point (P2P) interface 724 and P2P interface 728. Similarly, the processor 706 includes register registers 714, IMC 722 as well as P2P interface 726 and P2P interface 730. IMC 720 and IMC 722 couple the processors processor 704 and processor 706, respectively, to respective memories (e.g., memory 716 and memory 718). Memory 716 and memory 718 may be portions of the main memory (e.g., a dynamic random-access memory (DRAM)) for the platform such as double data rate type 3 (DDR3) or type 4 (DDR4) synchronous DRAM (SDRAM). In the present embodiment, the memories memory 716 and memory 718 locally attach to the respective processors (i.e., processor 704 and processor 706). In other embodiments, the main memory may couple with the processors via a bus and shared memory hub.

System 700 includes chipset 732 coupled to processor 704 and processor 706. Furthermore, chipset 732 can be coupled to storage device 750, for example, via an interface (I/F) 738. The I/F 738 may be, for example, a Peripheral Component Interconnect-enhanced (PCI-e).

Processor 704 couples to a chipset 732 via P2P interface 728 and P2P 734 while processor 706 couples to a chipset 732 via P2P interface 730 and P2P 736. Direct media interface (DMI) 774 and DMI 776 may couple the P2P interface 728 and the P2P 734 and the P2P interface 730 and P2P 736, respectively. DMI 774 and DMI 776 may be a high-speed interconnect that facilitates, e.g., eight Giga Transfers per second (GT/s) such as DMI 3.0. In other embodiments, the processor 704 and processor 706 may interconnect via a bus.

The chipset 732 may comprise a controller hub such as a platform controller hub (PCH). The chipset 732 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 732 may comprise more than one controller hub such as a chipset with a memory controller hub, a graphics controller hub, and an input/output (I/O) controller hub.

In the depicted example, chipset 732 couples with a trusted platform module (TPM) 744 and UEFI, BIOS, FLASH circuitry 746 via I/F 742. The TPM 744 is a dedicated microcontroller designed to secure hardware by integrating cryptographic keys into devices. The UEFI, BIOS, FLASH circuitry 746 may provide pre-boot code.

Furthermore, chipset 732 includes the I/F 738 to couple chipset 732 with a high-performance graphics engine, such as, graphics processing circuitry or a graphics processing unit (GPU) 748. In other embodiments, the system 700 may include a flexible display interface (FDI) (not shown) between the processor 704 and/or the processor 706 and the chipset 732. The FDI interconnects a graphics processor core in one or more of processor 704 and/or processor 706 with the chipset 732. Additionally, ML accelerator 754 coupled to chipset 732 via I/F 738. ML accelerator 754 can be circuitry arranged to execute ML related operations (e.g., training, inference, etc.) for ML models. In particular, ML accelerator 754 can be arranged to execute mathematical operations and/or operands useful for machine learning.

Various I/O devices 758 and display 752 couple to the bus 770, along with a bus bridge 756 which couples the bus 770 to a second bus 772 and an I/F 740 that connects the bus 770 with the chipset 732. In one embodiment, the second bus 772 may be a low pin count (LPC) bus. Various devices may couple to the second bus 772 including, for example, a keyboard 760, a mouse 762 and communication devices 764.

Furthermore, an audio I/O 766 may couple to second bus 772. Many of the I/O devices 758 and communication devices 764 may reside on the motherboard or system-on-chip (SoC) 702 while the keyboard 760 and the mouse 762 may be add-on peripherals. In other embodiments, some or all the I/O devices 758 and communication devices 764 are add-on peripherals and do not reside on the motherboard or system-on-chip (SoC) 702.

Figure 8:
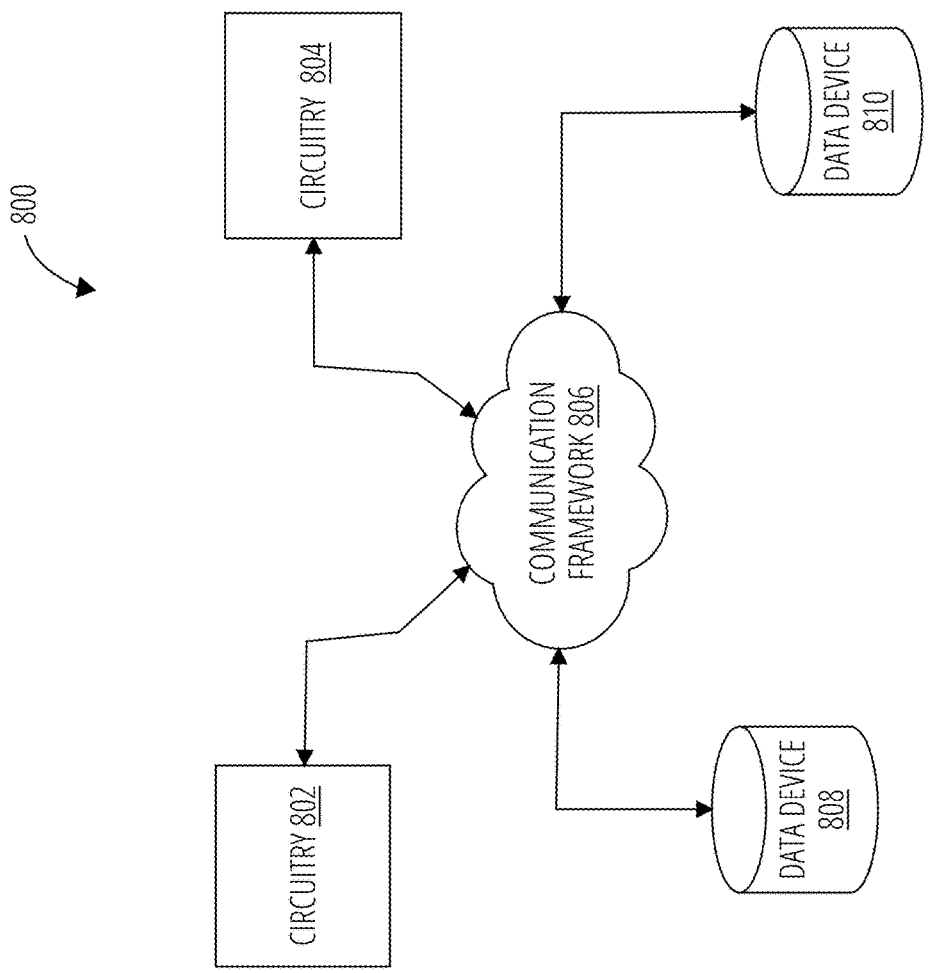
FIG. 8 illustrates an in-vehicle communication architecture 800 in accordance with non-limiting example(s) of the present disclosure.

FIG. 8 illustrates an in-vehicle communication architecture 800 according to one or more embodiments of the disclosure. For example, one or more vehicular devices, components, or circuits, such as circuitry 802 and/or circuitry 804, may communicate with each other via a communication framework 806, which may be an in-vehicle network, such as a CAN bus, implemented to facilitate the context-based attacking mitigation techniques described herein.

The in-vehicle communication architecture 800 includes various common communications elements, such as a transmitter, receiver, transceiver, and so forth. The embodiments, however, are not limited to implementation by the in-vehicle communication architecture 800. As shown in this figure, the vehicular circuitry 802 and circuitry 804 may each be operatively connected to one or more respective data devices, such as, data device 808 and/or data device 810 that can be employed to store information local to the respective circuitry 802 and/or circuitry 804, such as fingerprints, distributions, densities, voltage signals, or the like. It may be understood that the circuitry 802 and circuitry 804 may be any suitable vehicular component, such as sensor, an ECU, microcontroller, microprocessor, processor, ASIC, field programmable gate array (FPGA), any electronic device, computing device, or the like. Moreover, it may be understood that one or more computing devices (containing at least a processor, memory, interfaces, etc.) may be connected to the communication framework 806 in a vehicle.

Further, the communication framework 806 may implement any well-known communications techniques and protocols. As described above, the communication framework 806 may be implemented as a CAN bus protocol or any other suitable in-vehicle communication protocol. The communication framework 806 may also implement various network interfaces arranged to accept, communicate, and connect to one or more external communications networks (e.g., Internet). A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.7a-x network interfaces, IEEE 802.16 network interfaces, IEEE 802.20 network interfaces, and the like. Further, multiple network interfaces may be used to engage with various communications network types. The communication framework 806 may employ both wired and wireless connections.

The components and features of the devices described above may be implemented using any combination of: processing circuitry, discrete circuitry, application specific integrated circuits (ASICs), logic gates and/or single chip architectures, etc. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments have more features than are expressly recited in each claim. Rather, as the following claims reflect, the described subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodology, but one of ordinary skill in the art may recognize that many further combinations and permutations are possible. Accordingly, the novel architecture is intended to embrace all such alterations, modifications and variations that fall within the spirit and scope of the appended claims.

The following examples pertain to further embodiments, from which numerous permutations and configurations will be apparent.

Example 1. A computing apparatus comprising: a processor at an intrusion detection system of an autonomous system; and memory storing instructions, which when executed by the processor configure the apparatus to: receive a context associated with the autonomous system; receive a contract based on the context, the contract comprising an indication of acceptable actions for the autonomous system; detect an attack on the autonomous system; generate, responsive to the attack, at least one command according to the contract; and send the command to a subsystem of the autonomous system.

Example 2. The computing apparatus of claim 1, the autonomous system an autonomous vehicle, the context to comprise an indication of a roadway on which the autonomous vehicle is traveling.

Example 3. The computing apparatus of claim 2, the context comprising an indication of a plurality of segments of the roadway.

Example 4. The computing apparatus of claim 2, the context to comprise and indication of a geometry of the roadway and a characteristic of a shoulder of the roadway.

Example 5. The computing apparatus of claim 4, the contract comprising an indication of one or more acceptable behaviors for the autonomous vehicle, and one or more nominal mitigation actions, the instructions when executed by the processor configure the apparatus to generate the at least one command based on the one or more nominal mitigation actions.

Example 6. The computing apparatus of claim 4, the contract comprising an indication of one or more acceptable behaviors for the autonomous vehicle, one or more nominal mitigation actions, and one or more emergency mitigation actions, the instructions when executed by the processor configure the apparatus to generate the at least one command based on the one or more emergency mitigation actions.

Example 7. The computing apparatus of claim 2, the autonomous vehicle comprising a plurality of electronic control units (ECUs) coupled to an in-vehicle network (IVN), the attack comprising a masquerading attack or a bus-off attack initiated by a one of the plurality of ECUs.

Example 8. The computing apparatus of claim 7, the command comprising disconnecting the one of the plurality of ECUs from the IVN and sending a control signal to at least one other of the plurality of ECUs.

Example 9. A method, comprising: receiving, at an intrusion detection system (IDS) of an autonomous system, a context associated with the autonomous system; receiving, at the IDS, a contract based on the context, the contract comprising an indication of acceptable actions for the autonomous system; detecting, by the IDS, an attack on the autonomous system; generating, by the IDS responsive to the attack, at least one command according to the contract; and sending, from the IDS, the command to a subsystem of the autonomous system.

Example 10. The method of claim 9, the autonomous system an autonomous vehicle, the context to comprise an indication of a roadway on which the autonomous vehicle is traveling.

Example 11. The method of claim 10, the context comprising an indication of a plurality of segments of the roadway.

Example 12. The method of claim 10, the context to comprise and indication of a geometry of the roadway and a characteristic of a shoulder of the roadway.

Example 13. The method of claim 12, the contract comprising an indication of one or more acceptable behaviors for the autonomous vehicle, and one or more nominal mitigation actions, the method comprising generating the at least one command based on the one or more nominal mitigation actions.

Example 14. The method of claim 12, the contract comprising an indication of one or more acceptable behaviors for the autonomous vehicle, one or more nominal mitigation actions, and one or more emergency mitigation actions, the method comprising generating the at least one command based on the one or more emergency mitigation actions.

Example 15. The method of claim 10, the autonomous vehicle comprising a plurality of electronic control units (ECUs) coupled to an in-vehicle network (IVN), the attack comprising a masquerading attack or a bus-off attack initiated by a one of the plurality of ECUs.

Example 16. The method of claim 15, the command comprising disconnecting the one of the plurality of ECUs from the IVN and sending a control signal to at least one other of the plurality of ECUs.

Example 17. A non-transitory computer-readable storage medium, the computer-readable storage medium including instructions that when executed by an intrusion detection system (IDS) of an autonomous system, cause the IDS to: receive a context associated with the autonomous system; receive a contract based on the context, the contract comprising an indication of acceptable actions for the autonomous system; detect an attack on the autonomous system; generate, responsive to the attack, at least one command according to the contract; and send the command to a subsystem of the autonomous system.

Example 18. The computer-readable storage medium of claim 17, the autonomous system an autonomous vehicle, the context to comprise an indication of a roadway on which the autonomous vehicle is traveling.

Example 19. The computer-readable storage medium of claim 18, the context comprising an indication of a plurality of segments of the roadway.

Example 20. The computer-readable storage medium of claim 18, the context to comprise and indication of a geometry of the roadway and a characteristic of a shoulder of the roadway.

Example 21. The computer-readable storage medium of claim 20, the contract comprising an indication of one or more acceptable behaviors for the autonomous vehicle, and one or more nominal mitigation actions, the computer-readable storage medium including instructions that when executed by the IDS, cause the IDS to generate the at least one command based on the one or more nominal mitigation actions.

Example 22. The computer-readable storage medium of claim 20, the contract comprising an indication of one or more acceptable behaviors for the autonomous vehicle, one or more nominal mitigation actions, and one or more emergency mitigation actions, the computer-readable storage medium including instructions that when executed by the IDS, cause the IDS to generate the at least one command based on the one or more emergency mitigation actions.

Example 23. The computer-readable storage medium of claim 18, the autonomous vehicle comprising a plurality of electronic control units (ECUs) coupled to an in-vehicle network (IVN), the attack comprising a masquerading attack or a bus-off attack initiated by a one of the plurality of ECUs.

Example 24. The computer-readable storage medium of claim 23, the command comprising disconnecting the one of the plurality of ECUs from the IVN and sending a control signal to at least one other of the plurality of ECUs.

Example 25. A computing apparatus comprising: a processor at an intrusion detection system, comprising: means for receiving, at an intrusion detection system (IDS) of an autonomous system, a context associated with the autonomous system; means for receiving, at the IDS, a contract based on the context, the contract comprising an indication of acceptable actions for the autonomous system; means for detecting, by the IDS, an attack on the autonomous system; generating, by the IDS responsive to the attack, at least one command according to the contract; and means for sending, from the IDS, the command to a subsystem of the autonomous system.

Example 26. The apparatus of claim 25, the autonomous system an autonomous vehicle, the context to comprise an indication of a roadway on which the autonomous vehicle is traveling.

Example 27. The apparatus of claim 26, the context comprising an indication of a plurality of segments of the roadway.

Example 28. The apparatus of claim 26, the context to comprise and indication of a geometry of the roadway and a characteristic of a shoulder of the roadway.

Example 29. The method of claim 28, the contract comprising an indication of one or more acceptable behaviors for the autonomous vehicle, and one or more nominal mitigation actions, the method comprising generating the at least one command based on the one or more nominal mitigation actions.

Example 30. The apparatus of claim 28, the contract comprising an indication of one or more acceptable behaviors for the autonomous vehicle, one or more nominal mitigation actions, and one or more emergency mitigation actions, the apparatus comprising means for generating the at least one command based on the one or more emergency mitigation actions.

Example 31. The apparatus of claim 26, the autonomous vehicle comprising a plurality of electronic control units (ECUs) coupled to an in-vehicle network (IVN), the attack comprising a masquerading attack or a bus-off attack initiated by a one of the plurality of ECUs.

Example 32. The apparatus of claim 31, the command comprising disconnecting the one of the plurality of ECUs from the IVN and sending a control signal to at least one other of the plurality of ECUs.

What is claimed is:

1. A computing apparatus comprising:
    a processor circuit at an intrusion detection system of an autonomous system having a first control system and a second control system; and
    memory storing instructions, which when executed by the processor circuit causes the processor circuit to:
        receive a context associated with the autonomous system;
        receive a contract based on the context, the contract comprising an indication of acceptable actions for the autonomous system when the first control system is disconnected from the autonomous system;
        detect an attack on the autonomous system;
        generate, responsive to the attack, at least one command according to the contract; and
        send the command to the second control system of the autonomous system.

2. The computing apparatus of claim 1, the autonomous system an autonomous vehicle, the context comprises an indication of a roadway on which the autonomous vehicle is traveling.

3. The computing apparatus of claim 2, the context comprising an indication of a plurality of segments of the roadway.

4. The computing apparatus of claim 2, the context to comprise and indication of a geometry of the roadway and a characteristic of a shoulder of the roadway.

5. The computing apparatus of claim 4, the contract comprising an indication of one or more acceptable behaviors for the autonomous vehicle, and one or more nominal mitigation actions, the instructions when executed by the processor circuit causes the processor to generate the at least one command based on the one or more nominal mitigation actions.

6. The computing apparatus of claim 4, the contract comprising an indication of one or more acceptable behaviors for the autonomous vehicle, one or more nominal mitigation actions, and one or more emergency mitigation actions, the instructions when executed by the processor circuit causes the processor to generate the at least one command based on the one or more emergency mitigation actions.

7. The computing apparatus of claim 2, the autonomous vehicle comprising a plurality of electronic control units (ECUs) coupled to an in-vehicle network (IVN), the attack comprising a masquerading attack or a bus-off attack initiated by a one of the plurality of ECUs.

8. The computing apparatus of claim 7, the command comprising disconnecting the one of the plurality of ECUs from the IVN and sending a control signal to at least one other of the plurality of ECUs.

9. A method, comprising:
    receiving, at an intrusion detection system (IDS) of an autonomous system, a context associated with the autonomous system having a first control system and a second control system;
    receiving, at the IDS, a contract based on the context, the contract comprising an indication of acceptable actions for the autonomous system when the first control system is disconnected from the autonomous system;
    detecting, by the IDS, an attack on the autonomous system;
    generating, by the IDS responsive to the attack, at least one command according to the contract; and
    sending, from the IDS, the command to the second control system of the autonomous system.

10. The method of claim 9, the autonomous system an autonomous vehicle, the context comprises an indication of a roadway on which the autonomous vehicle is traveling.

11. The method of claim 10, the context comprising an indication of a plurality of segments of the roadway.

12. The method of claim 10, the context to comprise and indication of a geometry of the roadway and a characteristic of a shoulder of the roadway.

13. The method of claim 12, the contract comprising an indication of one or more acceptable behaviors for the autonomous vehicle, and one or more nominal mitigation actions, the method comprising generating the at least one command based on the one or more nominal mitigation actions.

14. The method of claim 12, the contract comprising an indication of one or more acceptable behaviors for the autonomous vehicle, one or more nominal mitigation actions, and one or more emergency mitigation actions, the method comprising generating the at least one command based on the one or more emergency mitigation actions.

15. The method of claim 10, the autonomous vehicle comprising a plurality of electronic control units (ECUs) coupled to an in-vehicle network (IVN), the attack comprising a masquerading attack or a bus-off attack initiated by a one of the plurality of ECUs.

16. The method of claim 15, the command comprising disconnecting the one of the plurality of ECUs from the IVN and sending a control signal to at least one other of the plurality of ECUs.

17. A non-transitory computer-readable storage medium, the computer-readable storage medium including instructions that when executed by an intrusion detection system (IDS) of an autonomous system, cause the IDS to:
  receive a context associated with the autonomous system having a first control system and a second control system;
  receive a contract based on the context, the contract comprising an indication of acceptable actions for the autonomous system when the first control system is disconnected from the autonomous system;
  detect an attack on the autonomous system;
  generate, responsive to the attack, at least one command according to the contract; and
  send the command to the second control system of the autonomous system.

18. The computer-readable storage medium of claim 17, the autonomous system an autonomous vehicle, the context comprises an indication of a roadway on which the autonomous vehicle is traveling.

19. The computer-readable storage medium of claim 18, the context comprising an indication of a plurality of segments of the roadway.

20. The computer-readable storage medium of claim 18, the context to comprise and indication of a geometry of the roadway and a characteristic of a shoulder of the roadway.

21. The computer-readable storage medium of claim 20, the contract comprising an indication of one or more acceptable behaviors for the autonomous vehicle, and one or more nominal mitigation actions, the computer-readable storage medium including instructions that when executed by the IDS, cause the IDS to generate the at least one command based on the one or more nominal mitigation actions.

22. The computer-readable storage medium of claim 20, the contract comprising an indication of one or more acceptable behaviors for the autonomous vehicle, one or more nominal mitigation actions, and one or more emergency mitigation actions, the computer-readable storage medium including instructions that when executed by the IDS, cause the IDS to generate the at least one command based on the one or more emergency mitigation actions.

23. The computer-readable storage medium of claim 18, the autonomous vehicle comprising a plurality of electronic control units (ECUs) coupled to an in-vehicle network (IVN), the attack comprising a masquerading attack or a bus-off attack initiated by a one of the plurality of ECUs.

24. The computer-readable storage medium of claim 23, the command comprising disconnecting the one of the plurality of ECUs from the IVN and sending a control signal to at least one other of the plurality of ECUs.

* * * * *